US012766689B2

(12) United States Patent
Su

(10) Patent No.: US 12,766,689 B2
(45) Date of Patent: Oct. 20, 2026

(54) AUTOMATIC NAIL DELIVERY DEVICE

(71) Applicant: GUANGZHE ENTERPRISE CO., LTD., Kaohsiung City (TW)

(72) Inventor: Fu Cheng Su, Kaohsiung City (TW)

(73) Assignee: GUANGZHE ENTERPRISE CO., LTD., Kaohsiung City (TW)

( * ) Notice: Subject to any disclaimer, the term of this patent is extended or adjusted under 35 U.S.C. 154(b) by 0 days.

(21) Appl. No.: 18/987,754

(22) Filed: Dec. 19, 2024

(65) Prior Publication Data

US 2026/0061583 A1 Mar. 5, 2026

(30) Foreign Application Priority Data

Sep. 3, 2024 (TW) ................................ 113133218

(51) Int. Cl.

*B25F 3/00* (2006.01)
*B25C 1/00* (2006.01)
*B25C 1/06* (2006.01)
*B25F 5/02* (2006.01)

(52) U.S. Cl.

CPC ................ *B25F 3/00* (2013.01); *B25C 1/003* (2013.01); *B25C 1/06* (2013.01); *B25F 5/02* (2013.01)

(58) Field of Classification Search

CPC ... B25F 3/00; B25F 5/02; B25C 1/003; B25C 1/06; B25C 1/006; B25B 23/045
USPC .......................................................... 227/129
See application file for complete search history.

(56) References Cited

U.S. PATENT DOCUMENTS

| | | | | |
|---|---|---|---|---|
| 5,138,913 | A * | 8/1992 | Chen | B25B 23/045 81/57.37 |
| 12,049,761 | B2 * | 7/2024 | Schuss, Jr. | E04D 15/04 |
| 2006/0157527 | A1 | 7/2006 | Yamamoto et al. | |
| 2007/0102440 | A1 * | 5/2007 | Matthiesen | B25B 23/045 221/156 |
| 2008/0190988 | A1 | 8/2008 | Pedicini et al. | |
| 2009/0294502 | A1 | 12/2009 | Kunz et al. | |
| 2010/0258608 | A1 | 10/2010 | Porth et al. | |
| 2012/0138656 | A1 * | 6/2012 | Xu | B25F 5/021 227/109 |

(Continued)

FOREIGN PATENT DOCUMENTS

| | | | |
|---|---|---|---|
| CA | 1007900 | 4/1977 | |
| CN | 103770078 | 5/2014 | |
| CN | 214446111 | * 10/2021 | B25C 1/06 |

(Continued)

*Primary Examiner* — Linda J. Hodge
(74) *Attorney, Agent, or Firm* — BACON & THOMAS, PLLC

(57) ABSTRACT

An automatic nail delivery device is mounted on an electric drill and is provided with a collating strip. The automatic nail delivery device has a casing, a base being movable relative to the casing, a guide rod mounted at the front of the electric drill, a push pulley mounted in the base and driving the collating strip, a drive mechanism, and a push spring mounted between the base and the casing and being capable of resetting the base. The collating strip can be mounted through the drive belt part at the bottom of the base and passed through the push pulley to the nail delivery port of the base. By the structural design of the drive belt part of the base, in the process of moving the casing and the base of the automatic nail delivery device, the drive belt part will move in synchronization with the base.

10 Claims, 12 Drawing Sheets

(56) References Cited

U.S. PATENT DOCUMENTS

| | | | | |
|---|---|---|---|---|
| 2015/0328754 | A1* | 11/2015 | Hung | B25C 1/003 81/434 |
| 2021/0402581 | A1 | 12/2021 | Jiang et al. | |

FOREIGN PATENT DOCUMENTS

| | | | | |
|---|---|---|---|---|
| CN | 218462453 | * | 2/2023 | B25C 1/06 |
| EP | 1920890 | | 5/2008 | |
| EP | 2786841 | A1 * | 10/2014 | B25B 23/045 |
| TW | M269161 | | 7/2005 | |
| TW | M315143 | | 7/2007 | |
| TW | 201634195 | | 10/2016 | |
| WO | 8902808 | | 4/1989 | |

* cited by examiner

AUTOMATIC NAIL DELIVERY DEVICE

BACKGROUND OF THE INVENTION

1. Field of the Invention

The present invention relates to an automatic nail delivery device, especially to an automatic nail delivery device that can be used with a collating strip and an electric drill and automatically push the nails.

2. Description of the Prior Arts

Nowadays, when decorating or fixing boards, the operator will use an automatic nail delivery device with an electric drill, and the automatic nail delivery device is configured to convey a collating strip with multiple nails. When the operator operates the automatic nail delivery device and the electric drill, the automatic nail delivery device can automatically push the collating strip after the electric drill locks the nails, so that the operator can sequentially lock the nail of the collating strip to fix articles or plates.

The conventional automatic nail delivery device comprises a carrier seat and an inner box. One end of the carrier seat can be assembled with the electric drill, and the bottom end of the carrier seat is formed with a collating strip holder where the collating strip is mounted through. The inner box is linearly movable and mounted in the carrier seat, and the inner box forms a nail outlet at the other end of the carrier seat opposite the end assembled with the electric drill. A pushing mechanism is mounted at the nail outlet of the inner box. Before using the automatic nail delivery device, the operator can mount the collating strip through the collating strip holder and through the pushing mechanism of the inner box.

When operating the automatic nail delivery device and the electric drill, the operator can press the electric drill to move the carrier seat and the inner box of the automatic nail delivery device relative to each other. Meanwhile, the electric drill can drive out the nails of the collating strip at the nail outlet, and after the carrier seat and the inner box are reset, the pushing mechanism of the inner box will move the collating strip so that another nail can move to the position of the nail outlet.

However, as mentioned above, in the operation of the conventional automatic nail delivery device, the carrier seat and the inner box will move relative to each other, so that the collating strip holder located on the carrier seat will also move relative to the inner box, resulting in the collating strip mounted through the collating strip holder and the inner box will be tugged and shifted in the process of moving the collating strip holder and the inner box relative to each other, which further affects the progress of the collating strip into the inner box and makes the collating strip transportation unsmooth.

To overcome the shortcomings, the present invention provides an automatic nail delivery device to mitigate or obviate the aforementioned problems.

SUMMARY OF THE INVENTION

The main objective of the present invention is to provide an automatic nail delivery device to mitigate the conventional automatic nail delivery device with the problem of poor transmission of the collating strip.

The automatic nail delivery device is configured to be mounted on an electric drill. A collating strip provided is capable of being mounted on the automatic nail delivery device. The automatic nail delivery device has a casing, a guide rod, a base, a push pulley, a drive mechanism, and a push spring.

The casing has a guide channel and a connection end. The guide channel is formed in an inner side wall of one side of the casing. The connection end is formed at one end of the casing, and the electric drill is detachably mounted at the connection end of the casing. The guide rod is detachably mounted at a front end of the electric drill and is capable of extending into the connection end of the casing.

The base is linearly movable and mounted in the casing, the guide rod extends into the base, and the base is capable of moving from a ready position toward the connection end of the casing to a nail position.

The base has a nail delivery port and a drive belt part. The nail delivery port is formed at one end of the base away from the connection end of the casing. The drive belt part is formed at a bottom end of the base, and the collating strip is capable of extending through the nail delivery port of the base via the drive belt part.

The push pulley is rotatably mounted at the nail delivery port of the base and has multiple matching gears. The multiple matching gears are formed on two opposite sides of the push pulley and are capable of engaging with the collating strip.

The drive mechanism has a ratchet structure, a drive arm, and a reset spring. The ratchet structure is mounted in the base and is connected to the push pulley, and the ratchet structure is capable of limiting the push pulley to rotate unidirectionally. The drive arm is connected to the ratchet structure and has a guide wheel part. The guide wheel part is formed at one end of the drive arm. The guide wheel part is mounted through one side of the base and extends into the guide channel of the casing. The reset spring is mounted on the push pulley and is connected to the drive arm.

The guide wheel part of the drive arm is capable of moving along the guide channel as the base is moving from the ready position to the nail position, such that the drive arm drives the guide wheel part to rotate the ratchet structure and the push pulley, and the reset spring drives the drive arm back when the base moves from the nail position to the ready position.

The push spring is mounted between the connection end of the casing and the base and is capable of resetting the base from the nail position back to the ready position.

The automatic nail delivery device in accordance with the present invention can be used with an electric drill and provide the collating strip to mount through the push pulley in the base and the nail delivery port from the drive belt part of the base. The automatic nail delivery device automatic can automatically feed nails by driving the drive mechanism to push the nail belt during the process of moving the base and the casing relative to each other. Since the collating strip is mounted through the drive belt part of the base, in the process of moving the casing and the base of the automatic nail delivery device, the drive belt part will move in synchronization with the base, which can avoid the collating strip from being pulled, resolving the problem of the collating strip being transported not smoothly.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
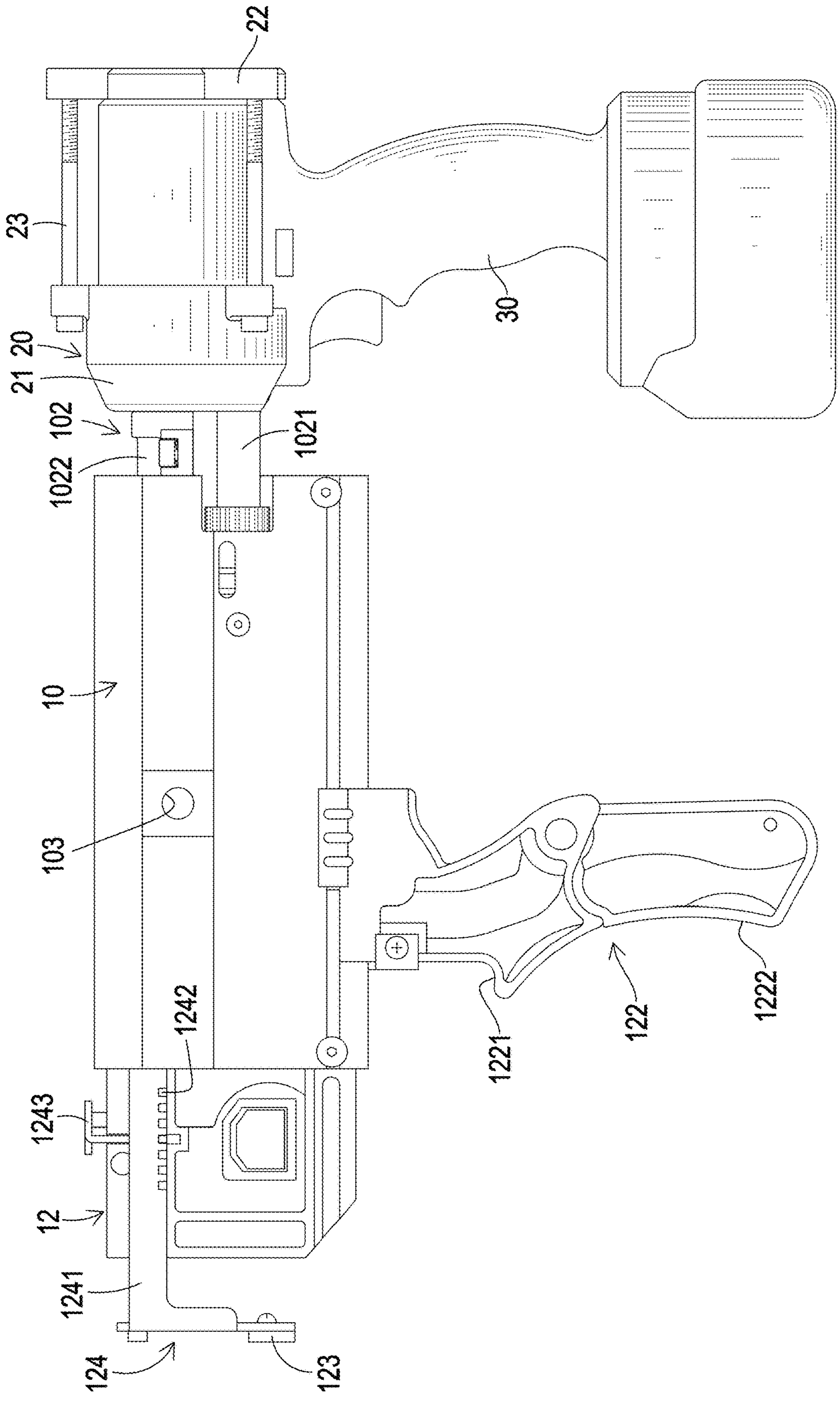
FIG. 1 is a side view of an automatic nail delivery device assembled with an electric drill in accordance with the present invention.

With reference to FIG. 1 to FIG. 4, and FIG. 9, an automatic nail delivery device in accordance with the present invention is configured to mount on an electric drill 30. A collating strip 40 can be mounted on the automatic nail delivery device. The automatic nail delivery device comprises a casing 10, a guide rod 11, a base 12, a push pulley 13, a drive mechanism 14 and a push spring.

With reference to FIG. 1 to FIG. 3, and FIG. 9, an inner side wall of one side of the casing 10 forms a guide channel 101, and one end of the casing 10 forms a connection end 102. The electric drill 30 is detachably mounted at the connection end 102 of the casing 10.

With reference to FIG. 1 to FIG. 3, and FIG. 9, the guide rod 11 is detachably mounted at a front end of the electric drill 30 and is capable of extending into the connection end 102 of the casing 10.

With reference to FIG. 1 to FIG. 3, and FIG. 9, the base 12 is linearly movably mounted in the casing 10, and the guide rod 11 extends into the base 12. The base 12 forms a nail delivery port 121 at one end of the connection end 102 away from the casing 10, and the bottom of the base 12 forms a drive belt part 122. The collating strip 40 can pass through the drive belt part 122 and extend through the nail delivery port 121 of the base 12. The base 12 can move from a ready position toward the connection end 102 of the casing 10 to a nail position.

With reference to FIG. 1 to FIG. 3, and FIG. 9, the push pulley 13 is rotatably mounted at the nail delivery port 121 of the base 12, and two opposite sides of the push pulley 13 from multiple matching gears 131. The multiple matching gears 131 can mingle with the collating strip 40.

With reference to FIG. 1 to FIG. 3, and FIG. 9, the drive mechanism 14 comprises a ratchet structure 141, a drive arm 142 and a reset spring 143. The ratchet structure 141 is mounted in the base 12 and is connected to the push pulley 13, and the ratchet structure 141 can limit the unidirectional rotation of the push pulley 13. The drive arm 142 is connected to the ratchet structure 141, and one end of the drive arm 142 forms a guide wheel part 1421. The guide wheel part 1421 is mounted through one end of the base 12 and extends into the guide channel 101 of the casing 10. The reset spring 143 is mounted on the push pulley 13 and connected with the drive arm 142, the guide wheel part 1421 of the drive arm 142 can move along the guide channel 101 as the base 12 is moving from the ready position toward the nail position, such that the drive arm 142 drives the guide wheel part 1421 to rotate the ratchet structure 141 and the push pulley 13, and the reset spring 143 drives the drive arm 142 back when the base 12 moves from the nail position back to the ready position.

With reference to FIG. 1 to FIG. 3, and FIG. 9, the push spring is mounted between the connection end of the casing 10 and the base 12 and can reset the base 12 from the nail position back to the ready position.

Figure 12:
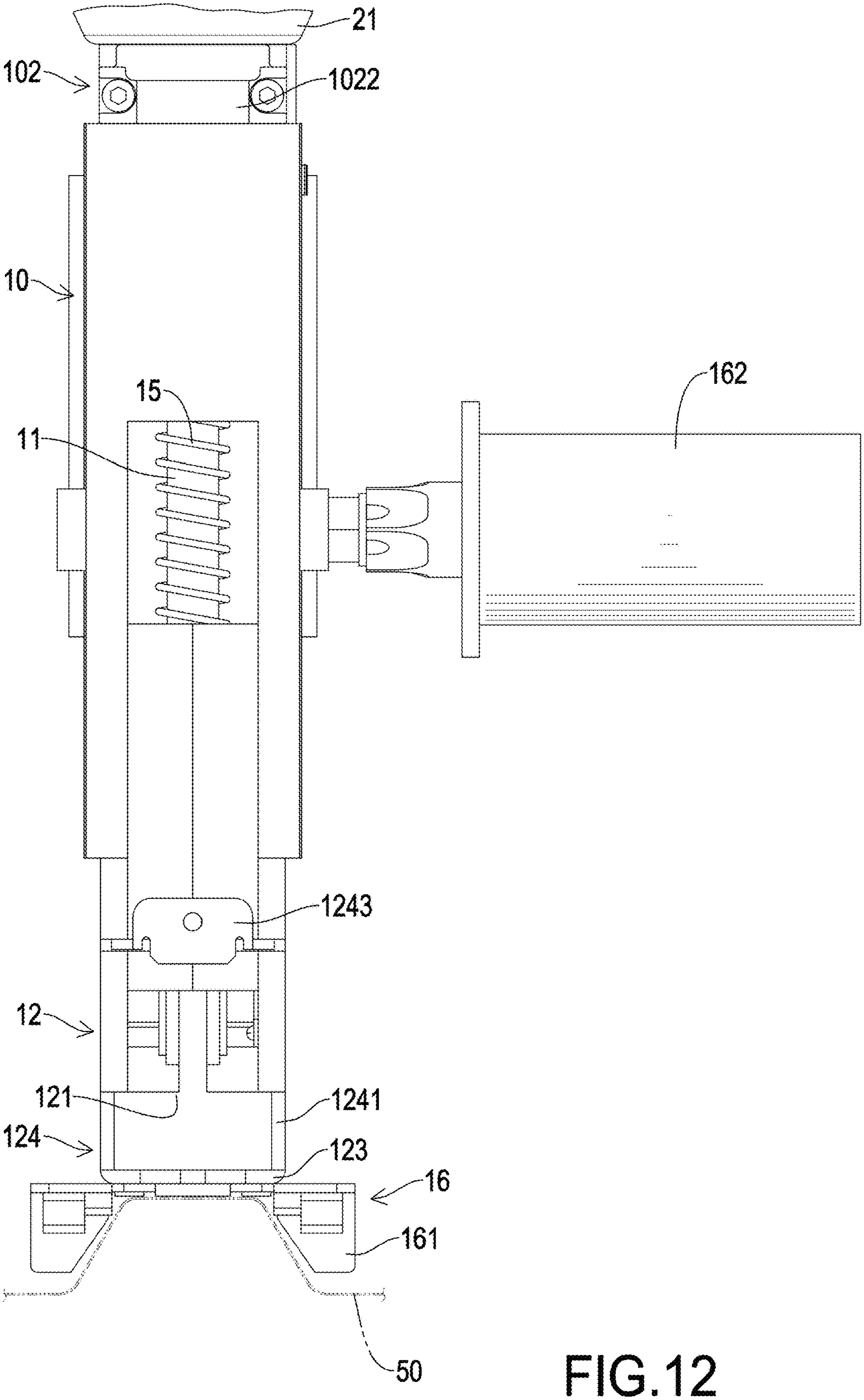
FIG. 12 is a schematic view of the automatic nail delivery device in FIG. 1, showing the automatic nail delivery device mounting a wave plate.

With reference to FIG. 12, the base 12 forms an assembly part 123 at the nail delivery port 121, and the automatic nail delivery device comprises a position member 16. The position member 16 is detachably mounted on the assembly part 123 of the base 12 and forms two support pads on one side of the position member, and the two support pads 161 are spaced apart.

Figure 2:
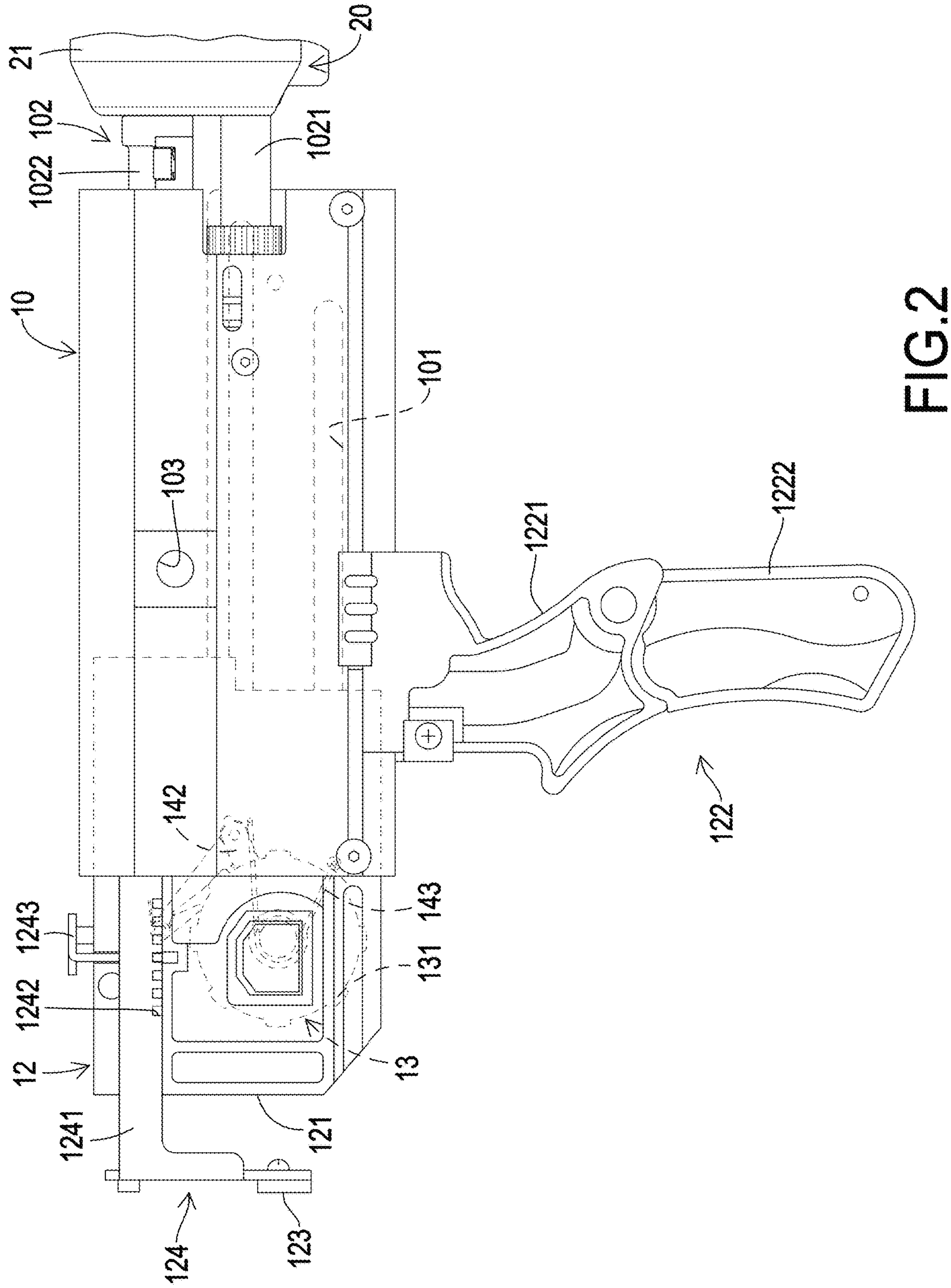
FIG. 2 is a schematic view of a drive mechanism of an automatic nail feeder of the automatic nail delivery device in FIG. 1.
Figure 3:
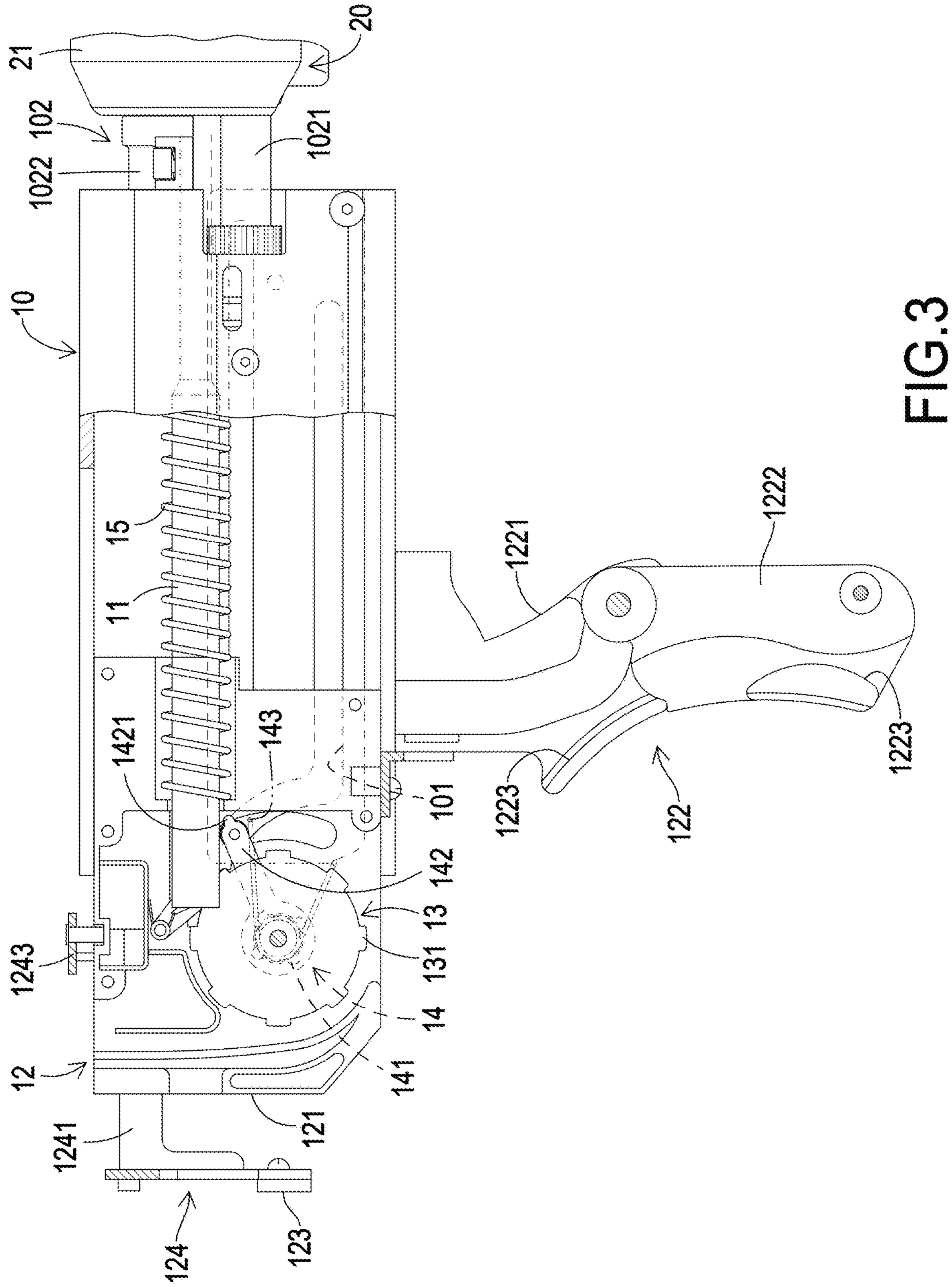
FIG. 3 is a partial cross-sectional view of the automatic nail feeder of the automatic nail delivery device in FIG. 1.
Figure 4:
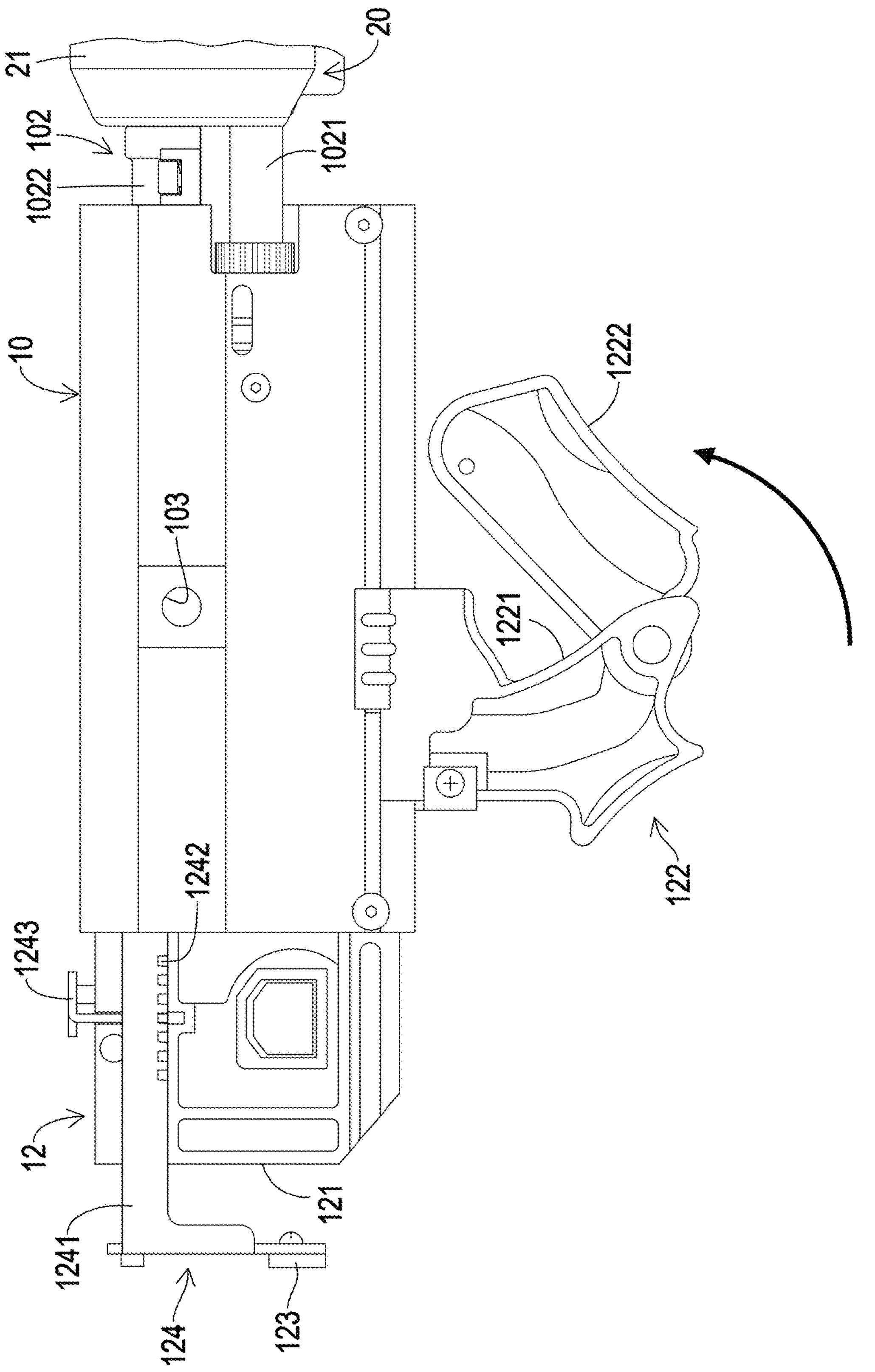
FIG. 4 is a schematic view of a drive belt part of the automatic nail feeder of the automatic nail delivery device in FIG. 1, showing the drive belt part folding.

With reference to FIG. 1 to FIG. 3, the base 12 of the automatic nail delivery device comprises a distance adjustment part 124. The distance adjustment part 124 comprises an adjustment gauge 1241 and a snap unit 1243. The adjustment gauge 1241 is position-adjustably mounted at the nail delivery port 121 of the base 12, and the adjustment gauge 1241 forms multiple snap grooves 1242. The snap unit 1243 is mounted on the base 12 and can snap to one of the snap grooves 1242 of the adjustment gauge 1241. In addition, the assembly part 123 can form on the adjustment gauge 1241.

With reference to FIG. 1 to FIG. 3, and FIG. 12, two opposite side walls of the casing 10 respectively form two assembly holes 103, and the automatic nail comprises an auxiliary handle 162. The auxiliary handle 162 is selectively mounted in one of the assembly holes 103 on either side of the casing 10.

With reference to FIG. 1 to FIG. 4, the drive belt part 122 of the base 12 comprises a first drive belt unit 1221 and a second drive belt unit 1222. The first drive belt unit 1221 is mounted on the base 12, and the second drive belt unit is pivotably mounted at a bottom of the first drive belt unit 1221. Each one of the first drive belt unit 1221 and the second drive belt unit 1222 forms a respective drive belt channel 1223, and the drive belt channels 1223 of the first drive belt unit 1221 and the second drive belt unit 1222 are capable of being connected to each other.

With reference to FIG. 1, FIG. 5 to FIG. 8, the automatic nail delivery device comprises a mating assembly 20. The mating assembly 20 comprises a mating cover 21, an abutting cover 22 and multiple locking members 23. A front end of the mating cover 21 forms an assembly part 211, and a middle of the assembly part 211 forms a through hole 212. The peripheries of the mating cover and the abutting cover 22 respectively have multiple corresponding locking holes formed thereon. The locking holes are arranged in circles on the mating cover 21 and the abutting cover 22. The mating cover 21 can be placed over the front end of the electric drill 30, such that the tool part 31 of the electric drill 30 can pass through the through hole 212 of the mating cover 21. The abutting cover 22 is mounted at the rear end of the electric drill 30. The multiple locking members 23 are mounted through the locking holes of the mating cover 21 and the abutting cover 22, and to enable the mating cover 21 and the abutting cover to clamp and be secured on the electric drill 30. The connection end 102 of the casing 10 comprises a mating seat 1021 and a fastener 1022. The fastener 1022 can lock with the mating seat 1021, clamping and securing the assembly part 211 of the mating cover 21.

Figure 5:
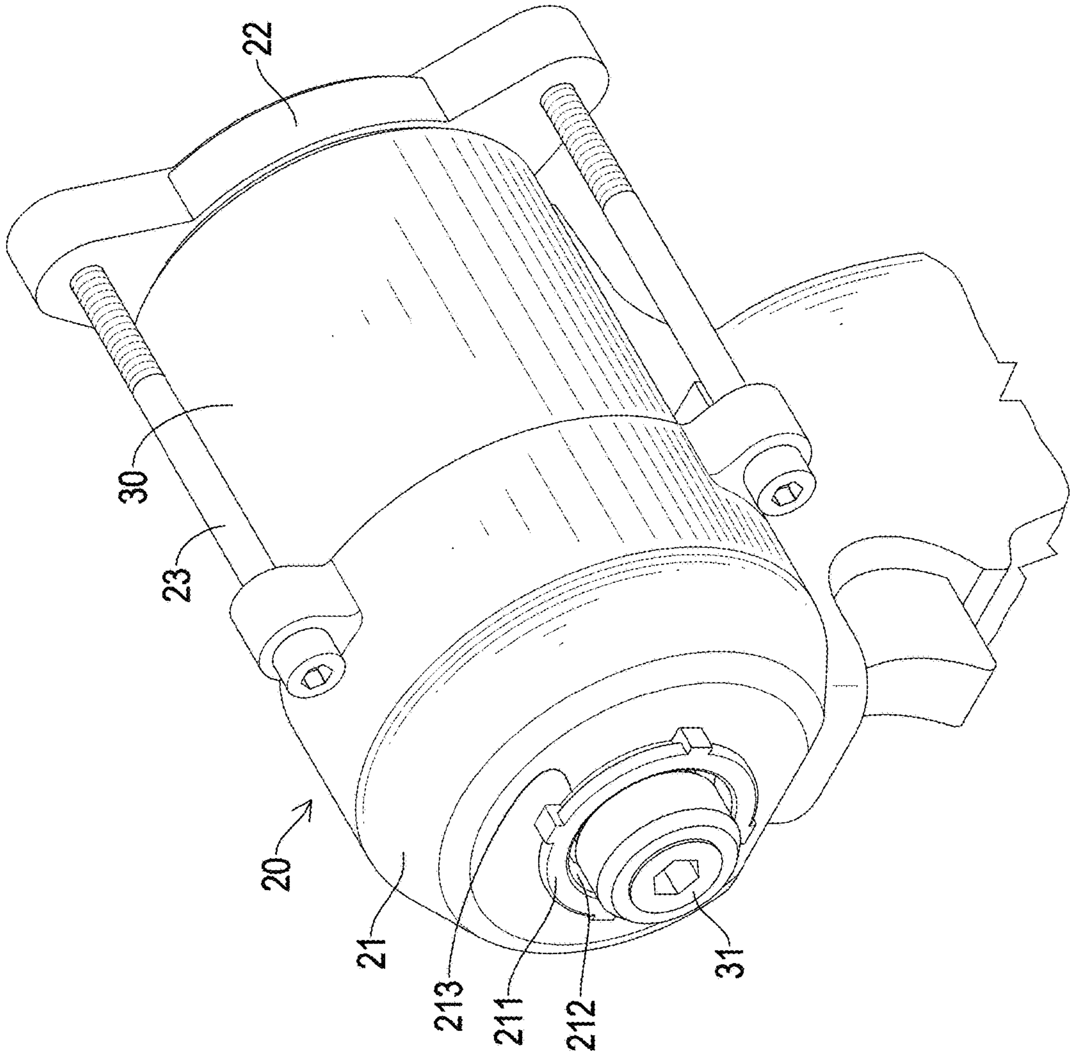
FIG. 5 is a schematic view of a mating assembly of the automatic nail delivery device assembled with the electric drill in FIG. 1.
Figure 6:
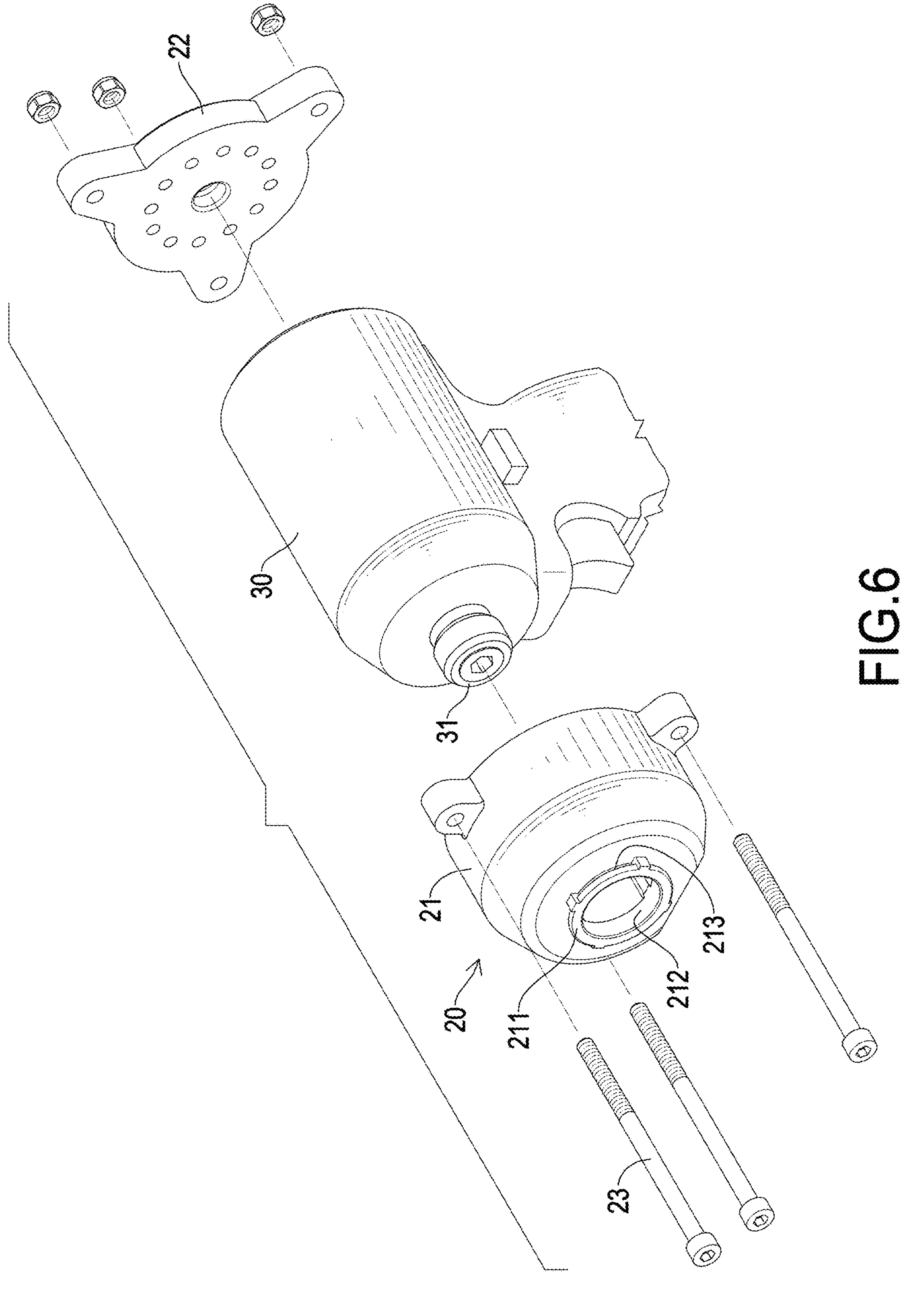
FIG. 6 is an exploded schematic view of the mating assembly in FIG. 5.

With reference to FIG. 1, FIG. 5 to FIG. 8, the automatic nail delivery device can be used with the electric drill 30. The automatic nail delivery device can clamp a variety of different models and types of the electric drill 30 via the mating assembly 20 and be assembled with the connection end 102 of the casing 10 via the assembly part 211 of the mating assembly 20. This creative automatic nail feeding device can be used with electric drilling tools 30, wherein this creative automatic nail feeding device can clamp and fix a variety of different models and types of electric drilling tools 30 through the said mating assembly 20, and can be assembled with the end portion 102 of the housing 10 through the assembly portion 211 of the said mating assembly 20. With reference to FIG. 5 and FIG. 6, when an operator installs the mating assembly 20 on the electric drill 30, the operator may first install the mating cover 21 and the abutting cover 22 of the mating assembly 20 on the two opposite ends of the electric drill 30 and mount the tool part 31 of the electric drill 30 through the through hole 212 of the mating cover 21. Then, the operator can mount the multiple locking members 23 through the mating cover 21 and the locking hole of the abutting cover 22 and adjust the locking members 23 to make the mating cover 21 and abutting cover 22 tightly clamp the electric drill 30 by adjusting the locking members 23.

Figure 7:
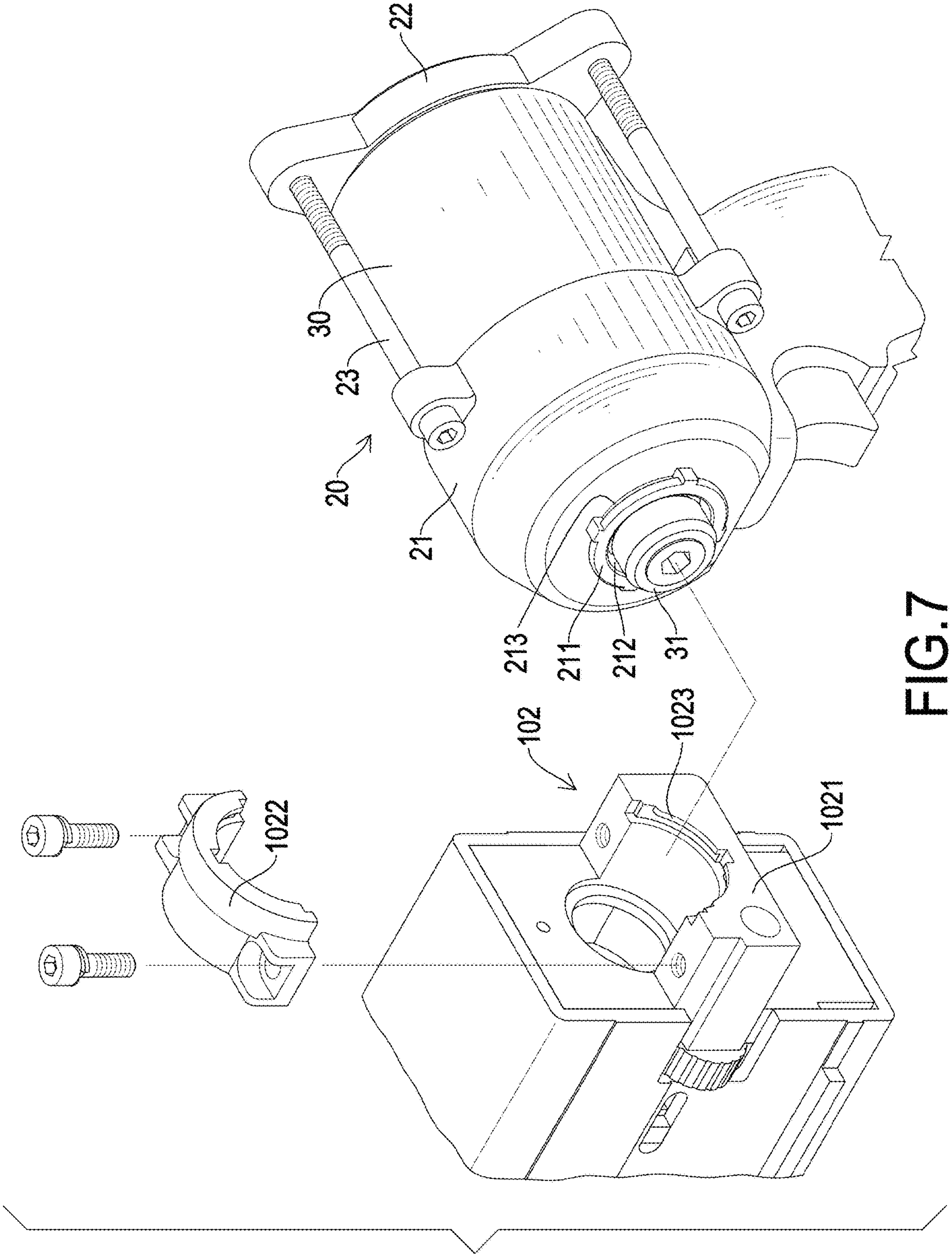
FIG. 7 is an exploded view of the mating assembly of the automatic nail delivery device assembled with a connection end of a casing in FIG. 1.
Figure 8:
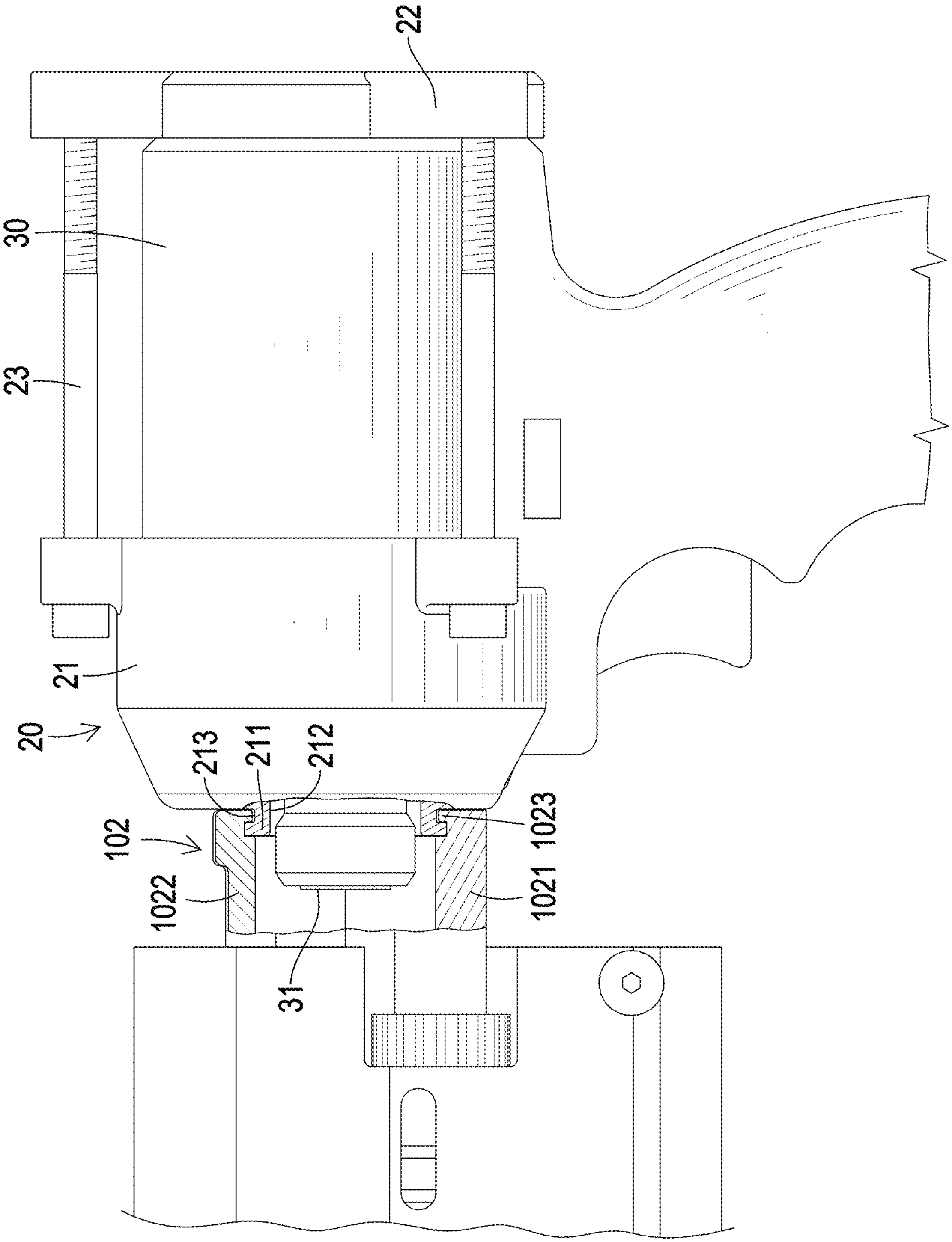
FIG. 8 is a partial cross-sectional view of the mating assembly of the automatic nail delivery device and the connection end of the casing in FIG. 1.

With reference to FIG. 7 and FIG. 8, the operator may mount the assembly part 211 of the mating cover 21 on the mating seat 1021 of the connection end 102 of the casing 10, so that the fastening block 1023 of the mating seat 1021 can be fastened into the fastening slot 213 of the assembly part 211 of the mating cover 21. Then by locking the fastener 1022 on the mating seat 1021, the fastening block 1023 of the fastener 1022 is fastened into the corresponding fastening slot 213 of the assembly part 211, the fastener 1022 and the mating seat 1021 are utilized to clamp and fix the assembly part 211, so as to fix the electric drill 30.

With reference to FIG. 5 and FIG. 6, the automatic nail delivery device can fix the electric drill 30 by means of the mating cover 21 and the abutting cover 22 of the mating assembly 20 combined with the multiple locking members 23, so that the mating assembly 20 can be suitable for clamping and fixing multiple models of the electric drill 30. The assembly part 211 of the mating cover 21 and the connection end 102 of the casing 10 are firmly assembled, so that the automatic nail delivery device is no longer limited by structural differences, and the suitability of the automatic nail delivery device with multiple models of the electric drill 30 is improved.

Figure 9:
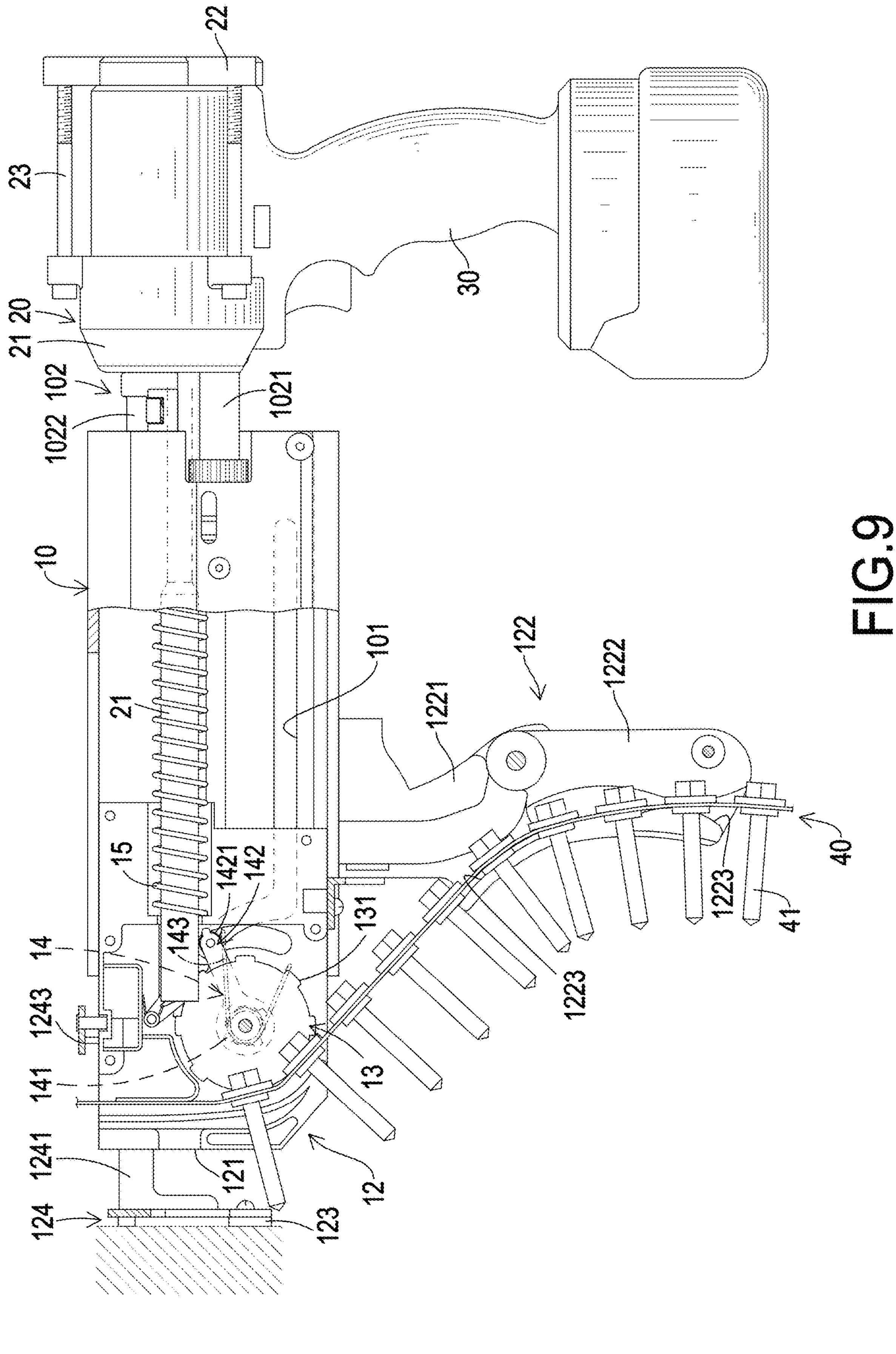
FIG. 9 is a schematic view of the automatic nail delivery device mounting a collating strip in FIG. 1.

With reference to FIG. 9, before using the automatic nail delivery device, the operator opens the second drive belt unit 1222 to the first drive belt unit 1221, and the drive belt channels 1223 of the first drive belt unit 1221 and the second drive belt unit 1222 communicate to each other. Then, the operator can mount the collating strip 40 through the drive belt channel 1223 of the second drive belt unit 1222. After the collating strip 40 is mounted through the drive belt channel of the first drive belt unit 1221, the operator can then extend the collating strip 40 through the nail delivery port 121 of the base 12 and engaged with the push pulley 13.

With reference to FIG. 9, when operating the automatic nail delivery device, the operator may hold the nail delivery port 121 of the base 12 of the automatic nail delivery device against the position where the nail 41 needs to be locked in. Then, with reference to FIG. 6, the operator may push the electric drill 30 forward. Meanwhile, the casing 10 of the automatic nail delivery device will move relative to the base 12, so that the base 12 will move from the ready position to the nail position.

Figure 10:
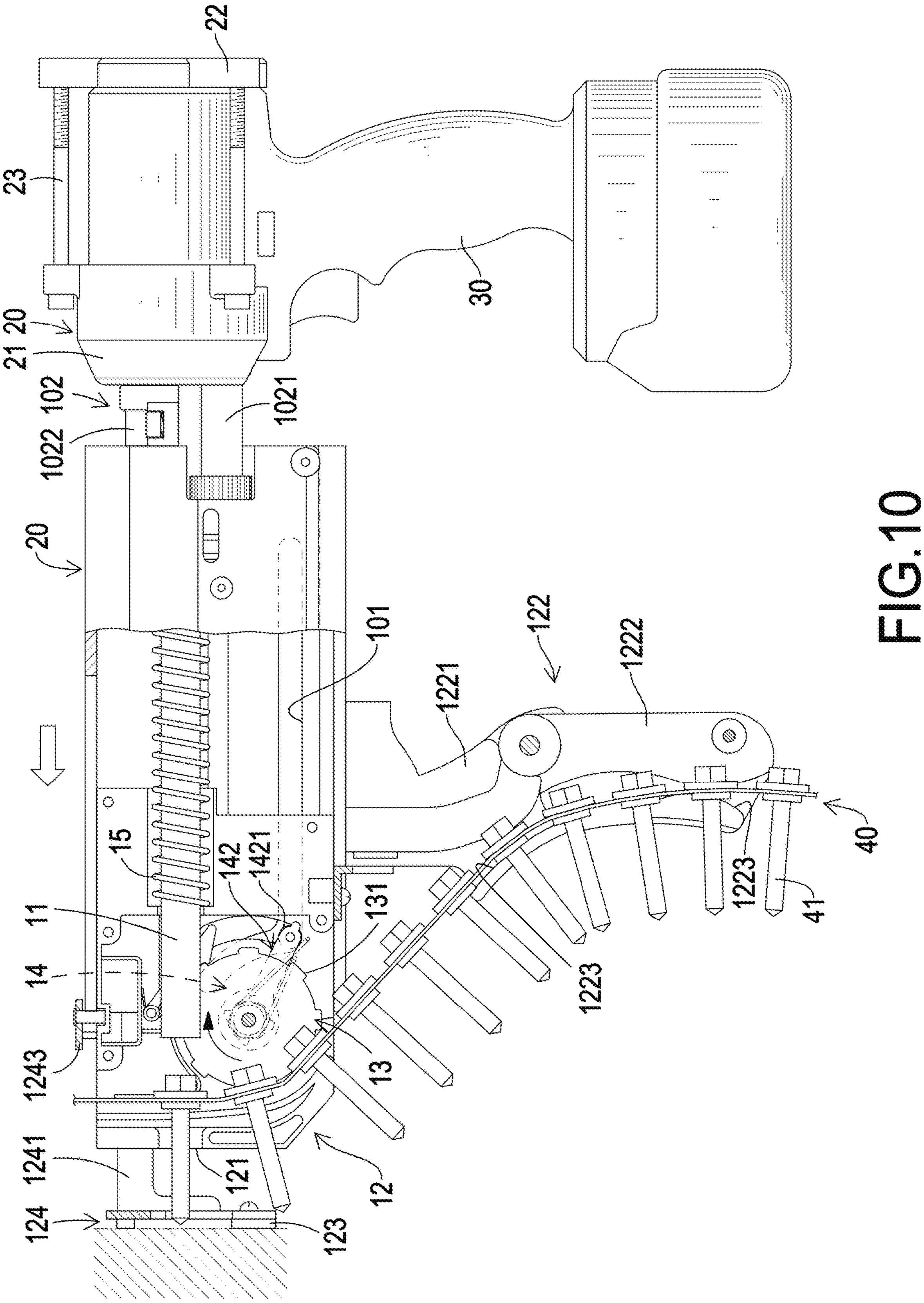
FIG. 10 is a schematic view of the operation mode of the automatic nail delivery device in FIG. 1.

With reference to FIG. 10, when the base 12 moves from the ready position to the nail position, the guide channel 101 of the inner side wall of the casing 10 will guide the drive arm 142 of the drive mechanism 14 to oscillate, so that the drive arm 142 will rotate the push pulley 13 and drive the nail 41 of the collating strip 40 to move to the nail delivery port 121.

In addition, since the collating strip 40 is mounted through the drive belt part 122 of the base 12, when the casing 10 and the base 12 of the automatic nail delivery device move relative to each other, the drive belt part 122 will move in synchronization with the base 12, which can prevent the collating strip 40 from being pulled, and further reducing the problem of the collating strip 40 being transported not smoothly.

Figure 11:
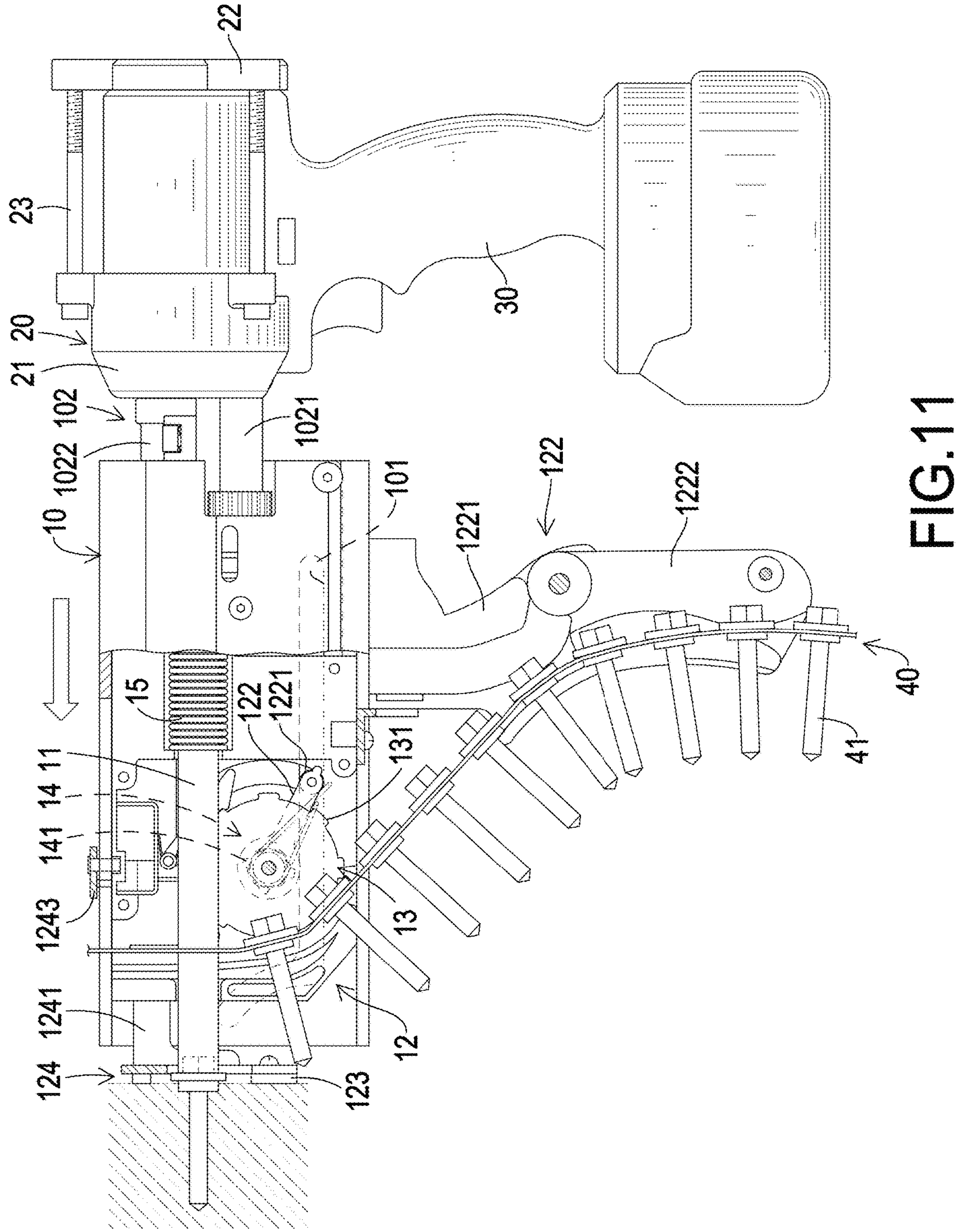
FIG. 11 is another schematic view of the operation mode of the automatic nail delivery device in FIGS. 1.

With reference to FIG. 11, when the operator continues to push the electric drill 30, the guide rod 11 at the front end of the electric drill 30 can fit into the end of the nail 41, and the operator may activate the electric drill 30 to lock the nail 41.

After locking the nail 41, the operator can pull back the electric drill 30, meanwhile, the push spring between the base 12 and the casing 10 will drive the base 12 back to the ready position from the nail position.

Wherein, when the base 12 is returned to the ready position from the nail position, the drive arm 142 will be reset by the reset spring 143, and in the process of resetting, the push pulley 13 will be influenced by the ratchet structure 141 and will not rotate in the reverse direction.

In addition, with reference to FIG. 12, when locking the wave plate 50, the operator may mount the position member 16 through the assembly part 123 of the base 12. The support pad 161 of the position member 16 abuts against two sides of the peaks of the wave plate 50, so that the operator is less likely to slip off during the locking of the nail 41 at the peak of the wave plate 50, which in turn effectively improves the convenience of operation.

Further, the operator may mount the auxiliary handle 162 in the assembly hole 103 of the casing 10, so that when operating the automatic nail delivery device, the operator can hold the auxiliary handle 162 with one hand and operate the electric drill 30 with the other hand, which can effectively improve the operability of the automatic nail delivery device. The operator May adjust the adjustment gauge 1241 of the base 12 according to the use demand to control the distance between the nail delivery port 121 of the automatic nail delivery device and the structure to be fixed.

In addition, the automatic nail delivery device can be used with a paper material collating strip 40, and it can effectively reduce the generation of plastic waste and improve environmental protection by using a paper collating strip 40.

In summary, by the structural design of the drive belt part 122 of the base 12, in the process of moving the casing 10 and the base 12 of the automatic nail delivery device, the drive belt part 122 will move in synchronization with the base 12, which can avoid the collating strip 40 from being pulled, reducing the problem of the collating strip 40 being transported not smoothly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automatic nail delivery device configured to be mounted on an electric drill, and a collating strip capable of being mounted on the automatic nail delivery device; the automatic nail delivery device comprising:

a casing comprising:

a guide channel formed in an inner side wall of one side of the casing; and a connection end formed at one end of the casing, and the electric drill detachably mounted at the connection end of the casing;

a guide rod detachably mounted at a front end of the electric drill and capable of extending into the connection end of the casing;

a base being linearly movable and mounted in the casing, the guide rod extending into the base, and the base capable of moving from a ready position toward the connection end of the casing to a nail position; the base comprising:

a nail delivery port formed at one end of the base, said end of the base being away from the connection end of the casing; and a drive belt part formed at a bottom end of the base, and the collating strip capable of extending through the nail delivery port of the base via the drive belt part;

a push pulley rotatably mounted at the nail delivery port of the base and comprising:

multiple matching gears formed on two opposite sides of the push pulley and capable of engaging with the collating strip;

a drive mechanism comprising:

a ratchet structure mounted in the base and connected to the push pulley, the ratchet structure capable of limiting the push pulley to rotate unidirectionally;

a drive arm connected to the ratchet structure and comprising:

a guide wheel part formed at one end of the drive arm, the guide wheel part mounted through one side of the base and extending into the guide channel of the casing; and a reset spring mounted on the push pulley and connected to the drive arm;

the guide wheel part of the drive arm capable of moving along the guide channel when the base is moving from the ready position to the nail position, such that the drive arm drives the guide wheel part to rotate the ratchet structure and the push pulley, and the reset spring drives the drive arm back when the base moves from the nail position to the ready position; and a push spring mounted between the connection end of the casing and the base and capable of resetting the base from the nail position back to the ready position;

wherein the drive belt part of the base comprises a first drive belt unit mounted on the base;

a second drive belt unit pivotably mounted at a bottom of the first drive belt unit;

the first drive belt unit and the second drive belt unit are foldable relative to each other; each one of the first drive belt unit and the second drive belt unit forming a respective drive belt channel and the drive belt channels of the first drive belt unit and the second drive belt unit being connectable to each other.

2. The automatic nail delivery device as claimed in claim 1, wherein the base comprises:

an assembly part formed at the nail delivery port; and the automatic nail delivery device comprises:

a position member detachably mounted on the assembly part of the base and comprising:

two support pads formed on one side of the position member, and the two support pads spaced apart.

3. The automatic nail delivery device as claimed in claim 2, wherein the base of the automatic nail delivery device comprises:

a distance adjustment part comprising:

an adjustment gauge position-adjustably mounted at the nail delivery port of the base and forming multiple snap grooves; the assembly part formed at one end of the adjustment gauge; and a snap unit mounted on the base and capable of being snapped to the snap grooves of the adjustment gauge.

4. The automatic nail delivery device as claimed in claim 3, wherein the casing comprises:

two assembly holes respectively formed on two opposite side walls of the casing; and the automatic nail delivery device comprises:

an auxiliary handle selectively mounted in one of the assembly holes on either side of the casing.

5. The automatic nail delivery device as claimed in claim 4, wherein the automatic nail delivery device comprises a mating assembly comprising:

a mating cover, a front end of the mating cover forming an assembly part, a middle of the assembly part forming a through hole; the mating cover capable of being placed over the front end of the electric drill, such that a tool part of the electric drill passes through the through hole of the mating cover;

an abutting cover mounted at a rear end of the electric drill;

multiple locking holes annularly formed on peripheries of the mating cover and the abutting cover respectively, the locking holes arranged in circles on the mating cover and the abutting cover;

multiple locking members mounted through the locking holes of the mating cover and the abutting cover, and to enable the mating cover and the abutting cover to clamp and be secured on the electric drill;

the connection end of the casing comprises:

a mating seat;

a fastener capable of being locked with the mating seat and clamping and securing the assembly part of the mating cover.

6. The automatic nail delivery device as claimed in claim 5, wherein the mating cover of the mating assembly forms multiple fastening slots around a periphery of the assembly part, the mating seat and the fastener of the connection end of the casing respectively form fastening blocks corresponding to the fastening slots of the assembly part, and the fastening blocks of the mating seat and the fastener are capable of extending and snapping into the fastening slots of the assembly part.

7. The automatic nail delivery device as claimed in claim 1, wherein the base of the automatic nail delivery device comprises:
a distance adjustment part comprising:
an adjustment gauge position-adjustably mounted at the nail delivery port of the base and forming multiple snap grooves; and
a snap unit mounted on the base and capable of being snapped to one of the snap grooves of the adjustment gauge.

8. The automatic nail delivery device as claimed in claim 1, wherein the casing comprises:
two assembly holes respectively formed on two opposite side walls of the casing; and
the automatic nail delivery device comprises:
an auxiliary handle selectively mounted in one of the assembly holes on either side of the casing.

9. An automatic nail delivery device configured to be mounted on an electric drill, and a collating strip capable of being mounted on the automatic nail delivery device;

the automatic nail delivery device comprising:
a casing comprising:
a guide channel formed in an inner side wall of one side of the casing; and
a connection end formed at one end of the casing, and the electric drill detachably mounted at the connection end of the casing;
a guide rod detachably mounted at a front end of the electric drill and capable of extending into the connection end of the casing;
a base being linearly movable and mounted in the casing, the guide rod extending into the base, and the base capable of moving from a ready position toward the connection end of the casing to a nail position; the base comprising:
a nail delivery port formed at one end of the base, said end of the base being away from the connection end of the casing; and
a drive belt part formed at a bottom end of the base, and the collating strip capable of extending through the nail delivery port of the base via the drive belt part;
a push pulley rotatably mounted at the nail delivery port of the base and comprising:
multiple matching gears formed on two opposite sides of the push pulley and capable of engaging with the collating strip;
a drive mechanism comprising:
a ratchet structure mounted in the base and connected to the push pulley, the ratchet structure capable of limiting the push pulley to rotate unidirectionally;
a drive arm connected to the ratchet structure and comprising:
a guide wheel part formed at one end of the drive arm, the guide wheel part mounted through one side of the base and extending into the guide channel of the casing; and
a reset spring mounted on the push pulley and connected to the drive arm;
the guide wheel part of the drive arm capable of moving along the guide channel when the base is moving from the ready position to the nail position, such that the drive arm drives the guide wheel part to rotate the ratchet structure and the push pulley, and the reset spring drives the drive arm back when the base moves from the nail position to the ready position; and
a push spring mounted between the connection end of the casing and the base and capable of resetting the base from the nail position back to the ready position;

wherein the automatic nail delivery device comprises
a mating assembly comprising:
a mating cover, a front end of the mating cover forming an assembly part, a middle of the assembly part forming a through hole; the mating cover capable of being placed over the front end of the electric drill, such that a tool part of the electric drill passes through the through hole of the mating cover;
an abutting cover mounted at a rear end of the electric drill;
multiple locking holes annularly formed on peripheries of the mating cover and the abutting cover respectively, the locking holes arranged in circles on the mating cover and the abutting cover;
multiple locking members mounted through the locking holes of the mating cover and the abutting cover, and to enable the mating cover and the abutting cover to clamp and be secured on the electric drill;
the connection end of the casing comprises:
a mating seat;
a fastener capable of being locked with the mating seat and clamping and securing the assembly part of the mating cover.

10. The automatic nail delivery device as claimed in claim 9, wherein the mating cover of the mating assembly forms multiple fastening slots around a periphery of the assembly part, the mating seat and the fastener of the connection end of the casing respectively form fastening blocks corresponding to the fastening slots of the assembly part, and the fastening blocks of the mating seat and the fastener are capable of extending and snapping into the fastening slots of the assembly part.

* * * * *